United States Patent
Lin

(10) Patent No.: US 7,174,412 B2
(45) Date of Patent: Feb. 6, 2007

(54) METHOD AND DEVICE FOR ADJUSTING LANE ORDERING OF PERIPHERAL COMPONENT INTERCONNECT EXPRESS

(75) Inventor: Chih-Jung Lin, Taoyuan (TW)

(73) Assignee: Genesys Logic, Inc., Taipei (TW)

( * ) Notice: Subject to any disclaimer, the term of this patent is extended or adjusted under 35 U.S.C. 154(b) by 151 days.

(21) Appl. No.: 10/921,116

(22) Filed: Aug. 19, 2004

(65) Prior Publication Data

US 2006/0041701 A1   Feb. 23, 2006

(51) Int. Cl.
*G06F 13/00* (2006.01)
(52) U.S. Cl. .................. 710/316; 710/107; 710/317
(58) Field of Classification Search ............. 710/316, 710/317, 107
See application file for complete search history.

(56) References Cited

U.S. PATENT DOCUMENTS

| | | | | |
|---|---|---|---|---|
| 5,446,482 A | * | 8/1995 | Van Aken et al. | 345/589 |
| 5,828,853 A | * | 10/1998 | Regal | 710/315 |
| 6,424,347 B1 | * | 7/2002 | Kwon | 345/520 |
| 6,961,347 B1 | * | 11/2005 | Bunton et al. | 370/465 |
| 2004/0088469 A1 | * | 5/2004 | Levy | 710/316 |
| 2005/0259696 A1 | * | 11/2005 | Steinman et al. | 370/535 |

OTHER PUBLICATIONS

PCI Express Base Specification Revision 1.0—Apr. 29, 2002—Section 4—pp. 1-2, 149-214.*

* cited by examiner

*Primary Examiner*—Rehana Perveen
*Assistant Examiner*—Jeremy S. Cerullo
(74) *Attorney, Agent, or Firm*—Rosenberg, Klein & Lee

(57) ABSTRACT

A method for adjusting the PCI Express lane ordering is disclosed, comprising the following steps. The first packet associated with a first PCI Express lane ordering is sent to the peripheral device. The peripheral device replies the second packet associated with the second PCI Express lane ordering. Whether the PCI Express lane ordering is correct is determined in response to said second packet. The first PCI Express lane ordering is adjusted while the first PCI Express lane ordering does not match the second PCI Express lane ordering. Preferably, the adjusted PCI Express lane order matches the normal order or the reverse order. Then, reset and reinitialize the peripheral device. The resetting step can be accomplished by sending reset packets, or changing the common mode voltage level in order to reset the bridge chipset of the PC.

20 Claims, 2 Drawing Sheets

METHOD AND DEVICE FOR ADJUSTING LANE ORDERING OF PERIPHERAL COMPONENT INTERCONNECT EXPRESS

BACKGROUND OF THE INVENTION

1. Field of the Invention

The present invention generally relates to peripheral component interconnect express (PCI Express) and, more particularly, to a method and device for lane ordering of PCI Express.

2. The Related Art

The standard bus for computer peripherals has evolved from the early ISA interface, EISA interface, PCI33 interface, to PCI66 interface and PCI133 interface. The PCI associated peripheral devices prevail in recent years.

The peripheral component interconnect express (PCI Express) interface is becoming the standard interface of next generation. PCI Express applies point-to-point transmission. For each end point, each PCI Express lane has a signal transmission pair and a signal receiving pair. For the current specification, PCI express has a differential signal transmission speed as high as 2.5 Gbps. PCI express data tranceiving requires four physical signals, and a plurality of control signals. Compared to PCI, the PCI Express can achieve a higher transmission rate with less physical pins. The PCI Express also defines various hardware specifications, including single lane, 4 lanes, 8 lanes, 16 lanes and 32 lanes, to meet the different bandwidth requirement of various peripheral devices. For example, a graphic card which needs a large bandwidth may use a 32-lane PCI Express interface. The PCI Express can be applied in the north bridge chip or the south bridge chip.

The PCI Express specification defines the termination state of the receiver and the transmitter, including impedance, and common mode voltage, . . . etc. The PCI Express specification also defines two types of lane order, the normal lane order and the reverse lane order. FIG. 1 shows a schematic diagram of a 4-lane PCI Express with the reverse lane order. The four PCI Express lanes on the left connect to the four PCI Express lanes on the right in the reverse order. The two ends are coupled through the 4-lane PCI Express slot (or connection) 100. In other words, the four PCI Express lanes on the left (Lane 0, Lane 1, Lane 2, and Lane 3) are coupled to the four PCI Express lanes on the right (Lane 3, Lane 2, Lane 1, and Lane 0), respectively. In another hardware coupling order, the four PCI Express lanes on the left (Lane 0, Lane 1, Lane 2, and Lane 3) are coupled to the four PCI Express lanes on the right (Lane 0, Lane 1, Lane 2, and Lane 3), respectively. Both coupling orders are accepted by the PCI specification. Nevertheless, various combinations of different IC designers, PCB manufacturers, and peripheral manufacturers may result in various hardware designs. Thus, incorrect PCI Express interconnection fails the final product.

SUMMARY OF THE INVENTION the present invention discloses a method for PCI Express lane ordering, comprising the following steps. The first packet associated with a first PCI Express lane ordering is sent to the peripheral device. The peripheral device replies the second packet associated with the second PCI Express lane ordering. Whether the PCI Express lane ordering is correct is determined in response to said second packet. The first PCI Express lane ordering is adjusted while the first PCI Express lane ordering does not match the second PCI Express lane ordering. Preferably, the adjusted PCI Express lane order matches the normal order or the reverse order. Then, reset and reinitialize the peripheral device. The resetting step can be accomplished by sending reset packets, or changing the common mode voltage level in order to reset the bridge chipset of the PC.

The present invention also discloses another method for PCI Express lane ordering, comprising the following steps. The first packet is sent to inform the peripheral of the first PCI Express lane ordering. The peripheral adjusts the second PCI Express lane order in response to the first packet.

The present invention further discloses a device for adjusting the PCI Express lane ordering. The device comprises a lane ordering circuit having a control bus, for inputting a first plurality of PCI Express lanes and outputting a second plurality of PCI Express lanes, wherein the ordering circuit routes the first plurality of PCI Express lanes to the second plurality of PCI Express lanes in response to a control signal sent through the control bus, so that the first plurality of PCI Express lanes and the second plurality of PCI Express lanes have a one-to-one correspondence.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
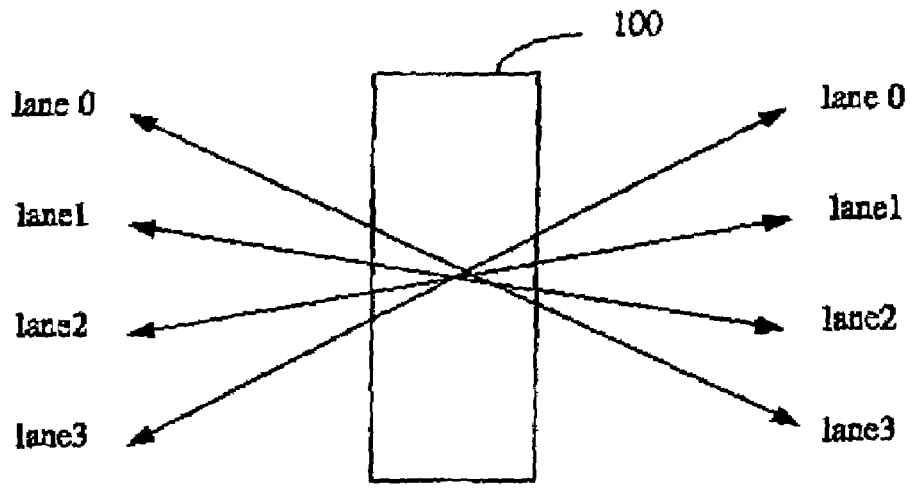
FIG. 1 shows a reverse order connection of a 4-lane PCI Express.
Figure 2:
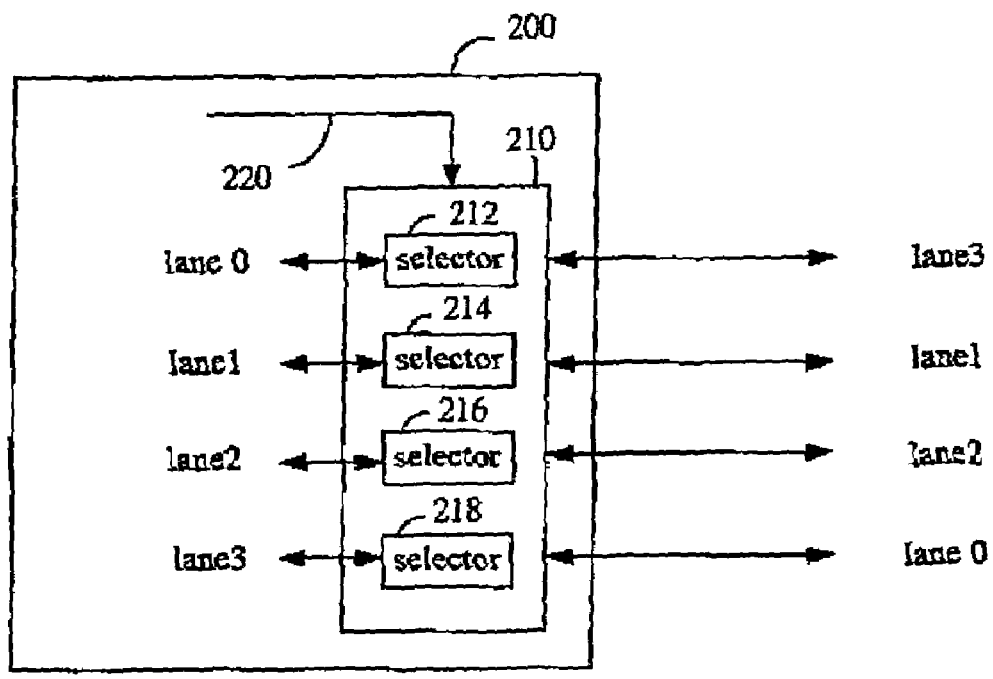
FIG. 2 shows a block diagram of an ordering circuit in accordance with the present invention.

FIG. 2 shows a block diagram of a lane ordering circuit in accordance with one embodiment of the present invention, applicable to a chip 200, such as the bridge IC (north bridge, and south bridge IC) in PCs, or the chip in the peripheral device. Bridge chip 200 provides the PCI Express lane 0, lane 1, lane 2, and lane 3, through an ordering device 210, for coupling with the external hardware. In this embodiment, the motherboard manufacturer intends to implement the lane ordering of the bridge chip 200 as lane 3, lane 1, lane 2 and lane 0 sequentially as shown in FIG. 2. When powered on, the bridge chip 200 and the peripheral device issue a series of training sequence according to PCI Express specification. First, the bridge chip 200 assumes the initial lane ordering of the peripheral device to be in the normal lane order of lane 0, lane 1, lane 2, and lane 3. The bridge chip 200 sends packets associated with its lane ordering to peripherals device, and the peripheral device replies the packets sent by the bridge chip 200 regarding their lane ordering. Upon receiving the reply from the peripheral device, the bridge chip 200 determines if the peripheral device has the correct lane ordering. If not, the bridge chip 200 signals the ordering device 210 through a control bus 220 to adjust the PCI Express lane ordering inside the bridge chip 200. In this embodiment, the PCI Express lane ordering inside the bridge chip 200 becomes lane 3, lane 1, lane 2, and lane 0 after the adjustment of the ordering device 210. For example, the ordering device 210 comprises four selectors 212, 214, 216, and 218. Each selector selectively couples one lane of the PCI Express inside the bridge chip 200 to an external PCI Express lane. In the hardware design, this can be accomplished by a state machine. Through signaling of the control bus 220, the routing path of selector 212, 214, 216, 218 of the ordering device 210 is properly adjusted, the PCI Express lanes of the bridge chip 200 (lane 0, lane 1, lane 2, lane 3) are routed correctly to the external PCI Express lanes (lane 0, lane 1, lane 2, lane 3), wherein each lane comprises four signal lines. Then, the bridge chip 200 resets the initialization processes at both ends. For example, the bridge chip 200 issues a plurality of reset packets or changes the common mode voltage, so that both ends restart their initialization processes. In other words, another series of training sequence will be issued to ensure the correct ordering of the PCI Express lanes. This allows more flexibility in circuit routing for system manufacturers. The reset packets can be generated by asserting the hot reset control bit of the training sequence more than once. The design of the ordering device 210 is also suitable for chips at the device's end. When the host informs the chip at the device's end of the lane ordering, the chip at the device's end may immediately adjust its internal PCI Express lane ordering. Thus, flexibility of circuit routing for system manufacturers for PCI Express is improved.

Figure 3:
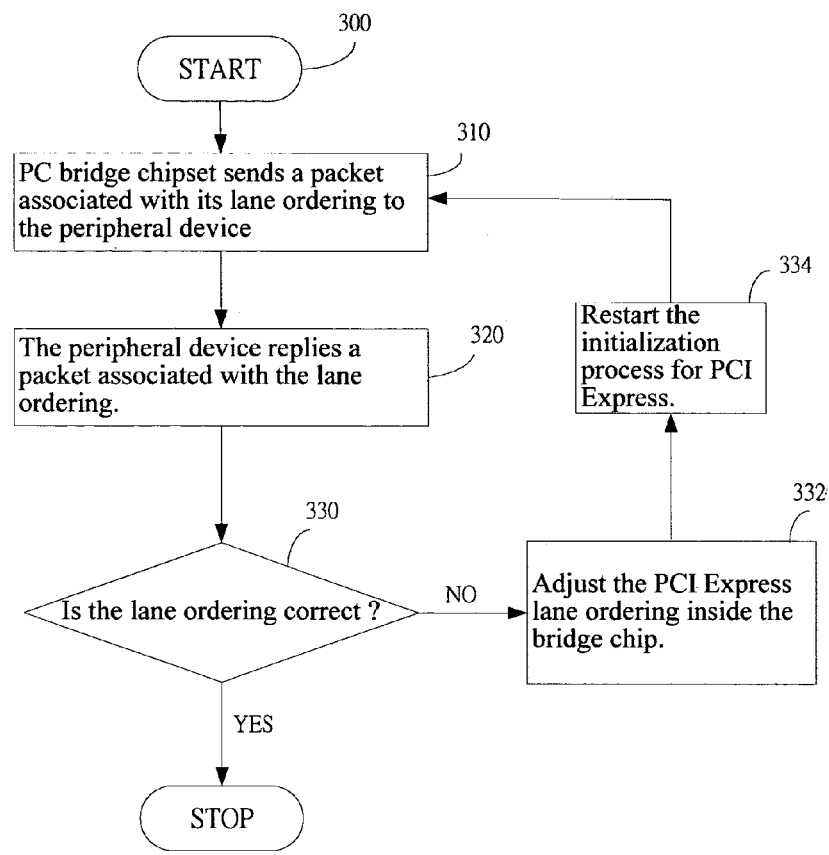
FIG. 3 shows a flowchart of a lane ordering method in accordance with the present invention

Referring to FIG. 3, a flowchart of the lane ordering method according to one embodiment of the present invention is shown and starts with step 300. In step 310, the bridge chip of the PC issues packets associated with its lane ordering to the peripheral device. In step 320, the peripheral device replies the packet associated with their lane ordering. In step 330, the bridge chip determines if the lane ordering is correct according to the replied packets. If not, in step 332, the PCI Express lane ordering inside the bridge chip is adjusted to match a normal order or a reverse order. In step 334, restarts the initialization process for PCI Express.

Figure 4:
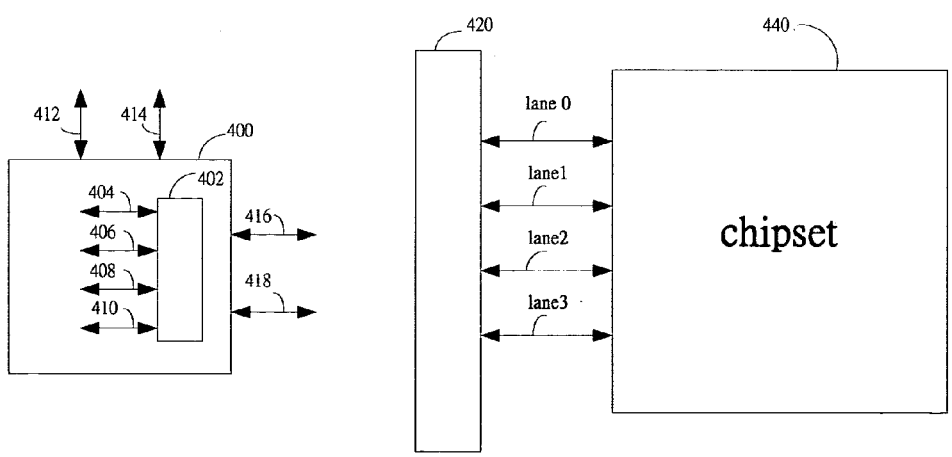
FIG. 4 shows a block diagram of an associated system applying a peripheral IC with the PCI Express lane ordering circuit according to one embodiment of the present invention.

FIG. 4 shows a block diagram of a system to apply the peripheral IC with the PCI Express lane ordering circuit according to one embodiment of the present invention. The peripheral device's chip 400 can be applied on an interface card and coupled to a chipset 440 on the motherboard through the PCI Express slot 420,. The left side of the chipset 440 provides PCI Express lane 0, lane 1, lane 2, and lane 3 for coupling the PCI Express slot 420. The chip 400 of the peripheral device provides four external PCI Express lanes 412, 414, 416, 418. In prior arts, the four PCI Express lanes 412, 414, 416, 418 correspond to PCI Express lane 0, lane 1, lane 2, and lane 3 of chip 400 on the peripheral device, thus requiring rotating the chip 400 of the peripheral device by an angle of 45 degrees clockwise, so that the chip 400 is directly coupled to the PCI Express slot 420 with the shortest distance and minimal trace turnings. However, if the four PCI Express lanes 412, 414, 416, 418 do not properly correspond to the PCI lanes, lane 3, lane 2, lane 1, lane 0 of the chip 400 of the peripheral device, the trace turning number and the route distance may increase when the motherboard is crowded with many IC chips, and the chip 400 and the chipset 440 can no longer be arranged side-by-side as shown in FIG. 4. This will cause the increase of impedance, and RLC effect. Because PCI Express operates at the speed as high as 2.5 Gbps, the increase of impedance and RLC effect is quite sensitive for the transmission quality. The present invention can improve this problem.

In this embodiment, the chip 400 of the peripheral device comprises a ordering device 402. The chip 400 of the peripheral device is designed to provide four PCI Express lanes 404, 406, 408, 410, corresponding to PCI Express lane 0, lane 1, lane 2, and lane 3, respectively. The system manufacturers can flexibly arrange the external PCI Express lanes 412, 414, 416, 418 to the PCI Express slot 420 according to various demands. First, the chipset 440 sends packets associated with own lane ordering to the chip 400 of peripheral device. When the chip 400, based on, determines that its PCI Express lane ordering is incorrect according to packets associated with the PCI Express lane ordering, the chip 400 signals the ordering device 402 to properly adjust the PCI Express lane ordering of the internal lanes 404, 406, 408, 410 of chip 400. Thus the correct lane coupling is accomplished, and the initialization process of PCI Express connection restarts. On the other hand, when the PCI Express lane ordering of the chipset 400 is correct, no further adjustment and initialization process is required.

The aforementioned embodiment shows the example of four PCI Express lanes. Compared to the conventional arts, such as north bridge chip, the north bridge chip has its north side connected to CPU bus, its right side connected to DRAM, its south side connected to the south bridge chip, and its left side connected to the advanced graphic port (AGP) bus. The PCI Express specification, such as the 32-lane PCI Express, will replace AGP bus as the new standard. As the north bridge chip has been limited by the available pad number, its pin-out (or ball-out) is also limited. As the motherboard usually comprises many components, the limitation on the pin-out of the north bridge chip will affect the board layout associated with the chips or PCI Express slot. This will also affect the size of the area on the motherboard occupied by the trace routing. Furthermore, because PCI Express operates for high speed transmission, indirect trace routing will severely affect the transmission quality.

In summary, the present invention discloses a method for PCI Express lane ordering, comprising the following steps. The first packet associated with a first PCI Express lane ordering is sent to the peripheral device. The peripheral device replies the second packet associated with the second PCI Express lane ordering. Whether the PCI Express lane ordering is correct is determined in response to said second packet. The first PCI Express lane ordering is adjusted while the first PCI Express lane ordering does not match the second PCI Express lane ordering. Preferably, the adjusted PCI Express lane order matches the normal order or the reverse order. Then, reset and reinitialize the peripheral device. The resetting step can be accomplished by sending reset packets, or changing the common mode voltage level in order to reset the bridge chipset of the PC.

The present invention also discloses another method for PCI Express lane ordering, comprising the following steps. The first packet is sent to inform the peripheral of the first PCI Express lane ordering. The peripheral adjusts the second PCI Express lane order in response to the first packet.

The present invention further discloses a device for adjusting the PCI Express lane ordering. The device comprises a lane ordering circuit having a control bus, for inputting a first plurality of PCI Express lanes and outputting a second plurality of PCI Express lanes, wherein the ordering circuit routes the first plurality of PCI Express lanes to the second plurality of PCI Express lanes in response to a control signal sent through the control bus, so that the first plurality of PCI Express lanes and the second plurality of PCI Express lanes have a one-to-one correspondence.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A method for adjusting a peripheral component interconnect express (PCI Express) lane ordering, comprising the following steps:

sending a first packet associated with a first PCI Express lane ordering to a peripheral device;

said peripheral device replying with a second packet associated with a second PCI Express lane ordering;

determining if the first PCI Express lane ordering matches the second PCI Express lane ordering in response to said second packet; and selectively adjusting said first PCI Express lane ordering responsive to the determination indicating said first PCI Express lane ordering does not match said second PCI Express lane ordering, a plurality of first PCI Express lanes being adaptively coupled thereby to a plurality of second PCI Express lanes in optimally routed manner.

2. The method as claimed in claim 1, wherein said second packet comprises a plurality of bytes, and one of the bytes indicates said second PCI Express lane ordering.

3. The method as claimed in claim 1, wherein said adjusted first PCI Express lane ordering has a preset chronological ordering.

4. The method as claimed in claim 1, wherein said adjusted first PCI Express lane ordering has a reverse ordering.

5. The method as claimed in claim 1 further comprising a step of resetting said peripheral device.

6. The method as claimed in claim 5, wherein the resetting step comprises sending a plurality of reset packets to reset said peripheral device.

7. The method as claimed in claim 5, wherein the resetting step changes the common mode voltage to reset said peripheral device.

8. The method as claimed in claim 5 further comprising a step of restarting an initialization process.

9. A method for adjusting a peripheral component interconnect express (PCI Express) lane ordering, comprising the following steps:

sending a first packet associated with a first PCI Express lane ordering to a peripheral device, and said peripheral device selectively adjusting a second PCI Express lane ordering to match said first PCI Express lane ordering in response to said first packet, a plurality of first PCI Express lanes being adaptively coupled thereby to a plurality of second PCI Express lanes in optimally routed manner.

10. The method as claimed in claim 9, wherein said first packet comprises a plurality of bytes, and one of the bytes indicates said first PCI Express lane ordering.

11. The method as claimed in claim 9, wherein said adjusted second PCI Express lane ordering has a normal ordering.

12. The method as claimed in claim 9, wherein said adjusted second PCI Express lane ordering has a reverse ordering.

13. The method as claimed in claim 9 further comprising a resetting step of sending a plurality of reset packets to reset a bridge chipset of a host.

14. The method as claimed in claim 9 further comprising a resetting step of changing the common mode voltage to reset a bridge chipset of a host.

15. The method as claimed in claim 9 further comprising a step of said peripheral device replying a second packet associated with said adjusted second PCI Express lane ordering.

16. A device for adjusting a PCI Express lane ordering comprising:

a lane ordering circuit having a control bus, for inputting a first plurality of PCI Express lanes and outputting a second plurality of PCI Express lanes, wherein the lane ordering circuit routes the first plurality of PCI Express lanes to the second plurality of PCI Express lanes to be respectively matched in selectively adjustable manner in response to a control signal sent through said control bus, so that the first plurality of PCI Express lanes and the second plurality of PCI Express lanes have a one-to-one correspondence, the first PCI Express lanes being adaptively coupled thereby to the second PCI Express lanes in optimally routed manner.

17. The device as claimed in claim 16, wherein the lane ordering circuit comprises a plurality of selectors, and each selector selectively couples a lane of the first plurality of PCI Express lanes to a lane of the second plurality of PCI Express lanes.

18. The device as claimed in claim 16, wherein the number of the first plurality of PCI Express lanes substantially equals the number of the second plurality of PCI Express lanes.

19. The device as claimed in claim 16, wherein the device is integrated into a chipset of a host.

20. The device as claimed in claim 16, wherein the device is integrated into a chip of a peripheral device of a host.

* * * * *